(12) United States Patent
Fischer et al.

(10) Patent No.: US 7,441,837 B2
(45) Date of Patent: Oct. 28, 2008

(54) INFLATABLE AIRBAG SYSTEM FOR VEHICLE SEAT ASSEMBLY

(75) Inventors: Harald Fischer, Unterensingen (DE); Dirk Benthaus, Verl (DE); Andreas Kellner, Gaertringen (DE)

(73) Assignee: Lear Corporation, Southfield, MI (US)

( * ) Notice: Subject to any disclaimer, the term of this patent is extended or adjusted under 35 U.S.C. 154(b) by 471 days.

(21) Appl. No.: 11/113,555

(22) Filed: Apr. 25, 2005

(65) Prior Publication Data

US 2006/0250000 A1   Nov. 9, 2006

(51) Int. Cl.
*B60N 2/42* (2006.01)

(52) U.S. Cl. .................. 297/216.1; 297/464; 297/487; 280/730.2

(58) Field of Classification Search .............. 297/216.1, 297/464, 487, 216.13; 280/728.3, 730.2, 280/730.1, 728.1, 728.2
See application file for complete search history.

(56) References Cited

U.S. PATENT DOCUMENTS

| | | | | |
|---|---|---|---|---|
| 5,251,931 A * | 10/1993 | Semchena et al. | ........ | 280/730.1 |
| 5,333,899 A * | 8/1994 | Witte | ........ | 280/730.2 |
| 5,536,038 A * | 7/1996 | Bollaert et al. | ........... | 280/730.2 |
| 5,542,696 A | 8/1996 | Steffens, Jr. et al. | ..... | 280/730.2 |
| 5,630,616 A * | 5/1997 | McPherson | .............. | 280/730.2 |
| 5,678,852 A | 10/1997 | Brown et al. | ............. | 280/730.2 |
| 5,695,242 A | 12/1997 | Brantman et al. | ........ | 297/216.1 |
| 6,299,197 B1 * | 10/2001 | Mueller | .................... | 280/728.3 |
| 7,021,654 B2 * | 4/2006 | Honda et al. | ............. | 280/730.2 |
| 7,086,663 B2 * | 8/2006 | Honda | ...................... | 280/730.2 |

FOREIGN PATENT DOCUMENTS

| | | | |
|---|---|---|---|
| GB | 2350334 A | | 11/2000 |
| GB | 2397047 A | | 7/2004 |
| JP | 3-281455 | * | 12/1991 |
| JP | 4-356246 | * | 12/1992 |
| JP | 5-229378 | * | 9/1993 |
| JP | 10071919 A | | 3/1998 |
| JP | 2003237522 A | | 8/2003 |
| WO | WO 00/09364 | | 2/2000 |

* cited by examiner

*Primary Examiner*—Laurie K Cranmer
(74) *Attorney, Agent, or Firm*—Bliss McGlynn, P.C.

(57) ABSTRACT

An inflatable airbag system for a vehicle seat assembly of a vehicle. The inflatable airbag system includes a cover member adapted for mounting to the vehicle seat assembly. The inflatable airbag system also includes an inflatable airbag adapted to inflate outward from the cover member and outward from the vehicle seat assembly to thereby act as a protective barrier between an occupant of the vehicle seat assembly and an interior surface of the vehicle.

9 Claims, 3 Drawing Sheets

INFLATABLE AIRBAG SYSTEM FOR VEHICLE SEAT ASSEMBLY

BACKGROUND OF THE INVENTION

1. Field of the Invention

The present invention relates, generally, to inflatable airbags, and more specifically to an inflatable airbag system for a vehicle seat assembly.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt extending diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle.

Although airbag systems have worked for their intended purpose, some disadvantages remain. For instance, stowed airbag systems can take up significant room within the vehicle. Thus, designing adequate space for stowing an airbag system within the vehicle can be difficult.

Furthermore, the operating life of airbag systems can be limited by exposure to contaminants, loading, and the like. For instance, door-mounted airbag systems can be particularly susceptible to contamination because the airbag system in effect moves outside the vehicle when the door is opened. Slamming the vehicle door can also impart harmful loads on these door-mounted airbag systems.

Moreover, airbag systems can include expensive components. For instance, many airbag systems include a cover member in which the inflatable airbag is stowed. When the airbag inflates for deployment out of the cover member, the airbag transfers significant force to the cover member. The cover member is typically designed to withstand these forces and remain intact to thereby direct the inflating airbag in the predetermined direction. In order to withstand these forces, the cover member is made out of relatively expensive material, which is undesirable.

Therefore, there remains a need in the art for an airbag system that can be conveniently and compactly stowed within a vehicle. There also remains a need in the art for an airbag system that is less susceptible to contamination so as to improve the operating life of the airbag system. Furthermore, there remains a need in the art for an airbag system that includes less expensive components.

SUMMARY OF THE INVENTION

The disadvantages of the related art are overcome in an inflatable airbag system for a vehicle seat assembly of a vehicle. The inflatable airbag system includes a cover member adapted for mounting to the vehicle seat assembly. The inflatable airbag system also includes an inflatable airbag adapted to inflate outward from the cover member and outward from the vehicle seat assembly to thereby act as a protective barrier between an occupant of the vehicle seat assembly and an interior surface of the vehicle.

The inflatable airbag system can be compactly stowed within the vehicle and can provide improved restraint of an occupant. Also the inflatable airbag system can have reduced material costs. Furthermore, the inflatable airbag system can utilize the seat assembly as a barrier from potentially contaminating materials to thereby extend the operating life of the system.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
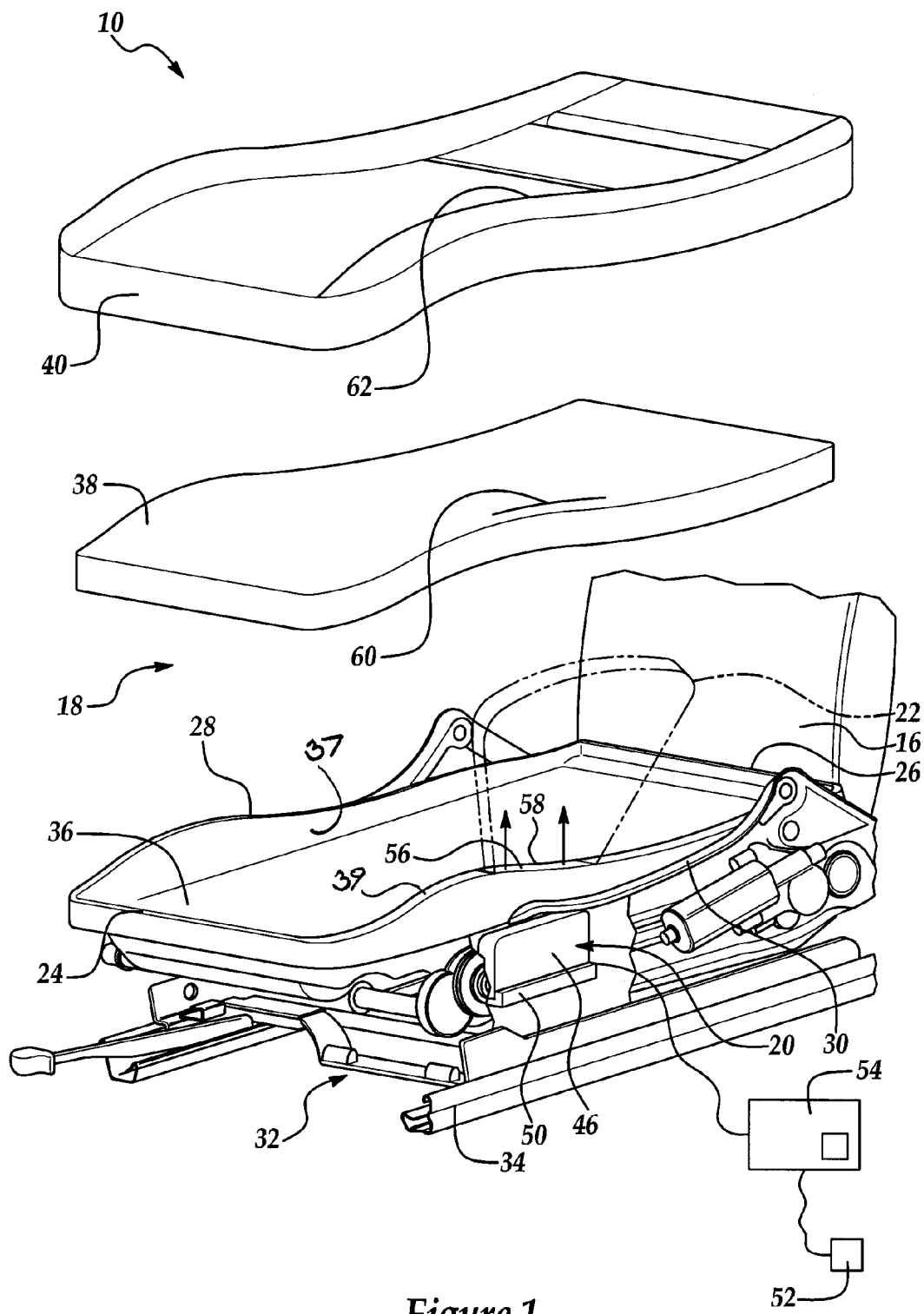
FIG. 1 is an exploded perspective view of one embodiment of a vehicle seat assembly illustrating a lower seat assembly and an inflatable airbag system of the present invention.
Figure 2:
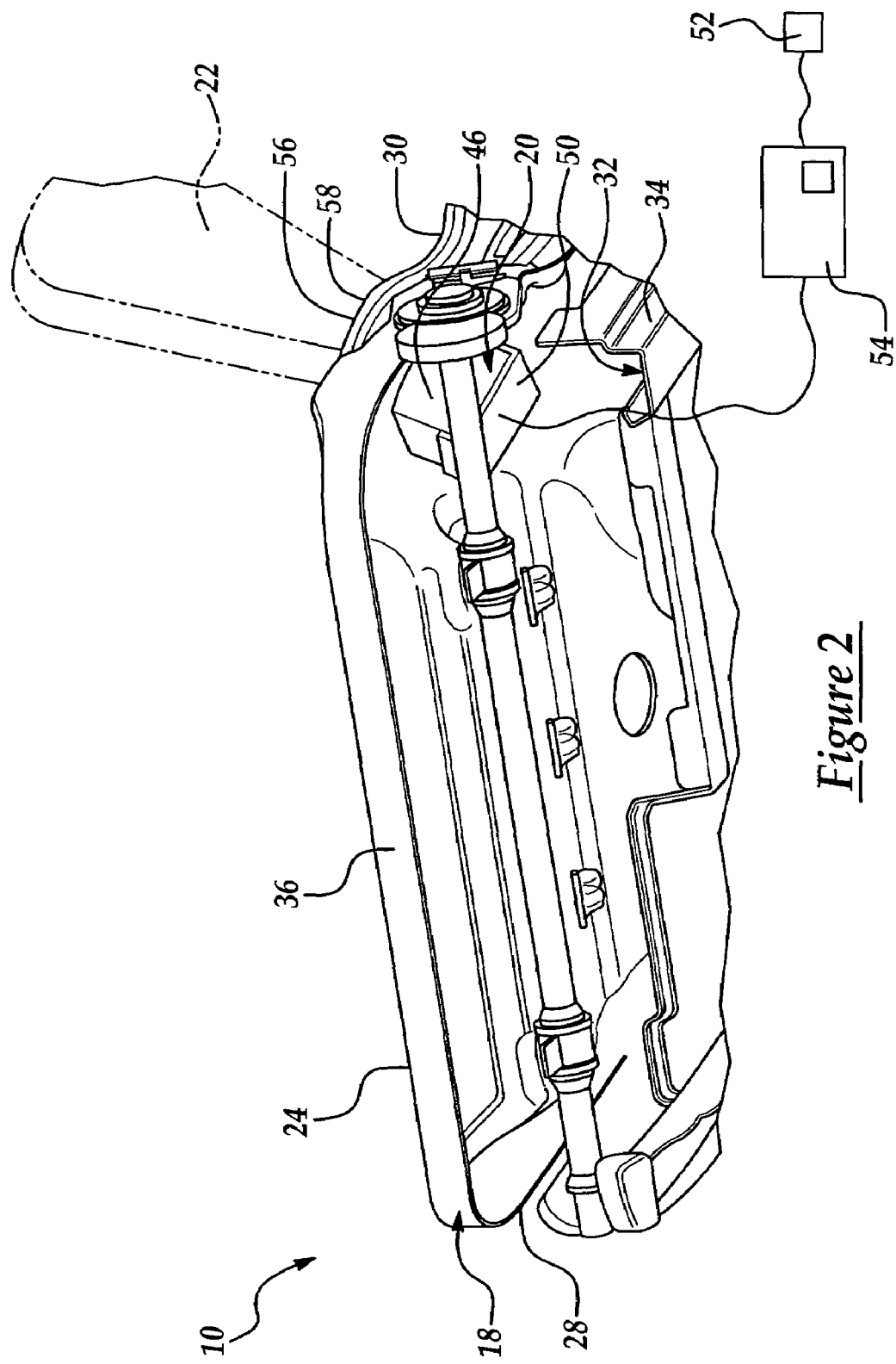
FIG. 2 is a bottom perspective view of the vehicle seat assembly and inflatable airbag system of FIG. 1.
Figure 3:
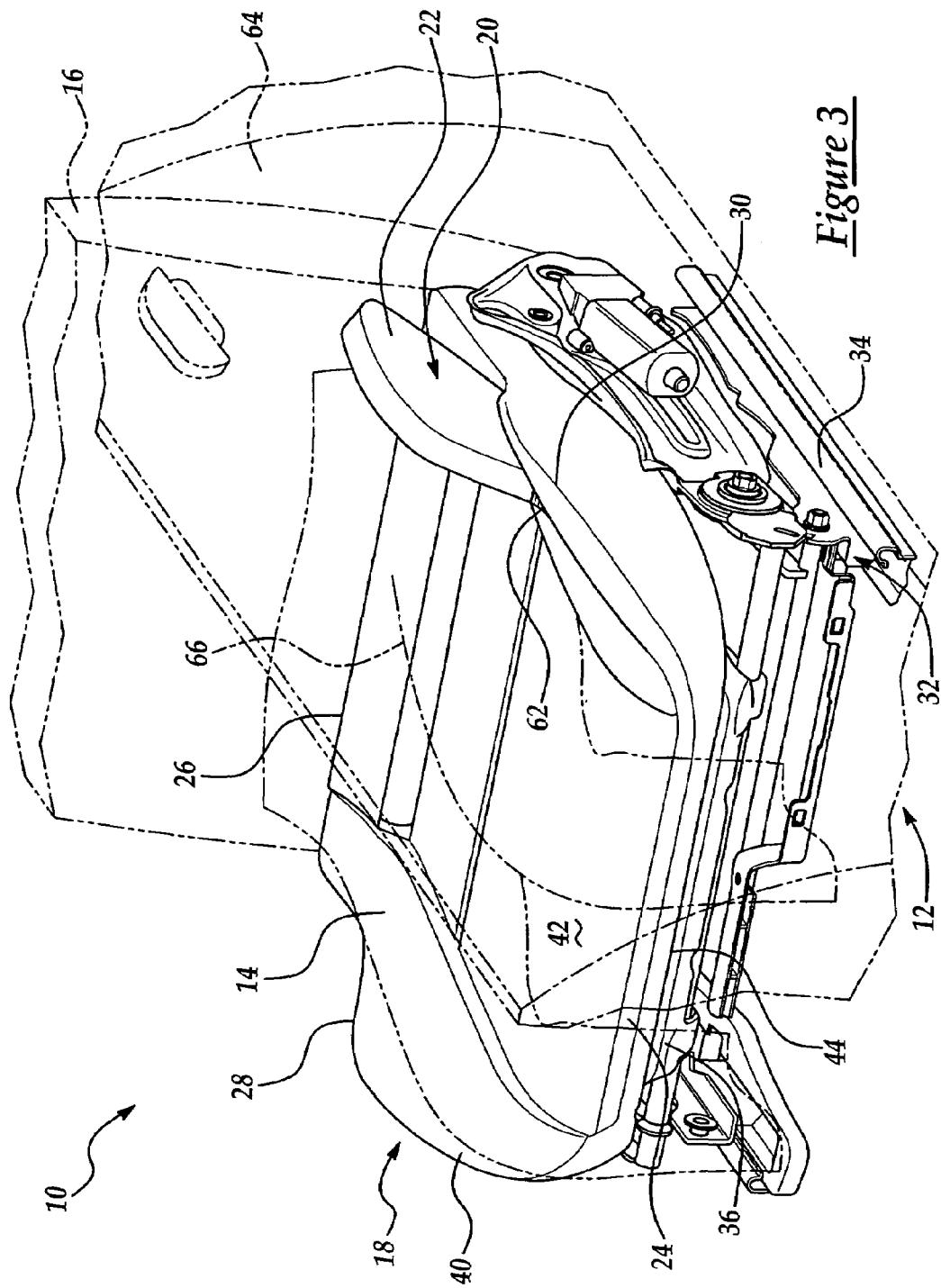
FIG. 3 is a top perspective view of the vehicle seat assembly and inflatable airbag system of FIGS. 1 and 2 shown in relation to an occupant and to a vehicle.

Referring now to the drawings, where like numerals are used to designate like structure throughout the figures, one embodiment of a vehicle seat assembly of the present invention is generally indicated at 10 in FIGS. 1-3. The vehicle seat assembly 10 can be disposed within a vehicle 12 (partially illustrated in phantom in FIG. 3) such as an automobile, but those having ordinary skill in the art will appreciate that the vehicle seat assembly 10 could be disposed within any suitable vehicle 12 without departing from the scope of the invention. The vehicle seat assembly 10 is adapted to support an occupant partially illustrated in phantom at 14 in FIG. 3. The vehicle seat assembly 10 includes a seat back 16 and a lower seat assembly 18 as shown in FIGS. 1 and 3. The lower seat assembly 18 defines a front end 24, a rear end 26, an inboard side 28, and an outboard side 30. The seat back 16 is operatively attached to the lower seat assembly 18 at the rear end 26. The lower seat assembly 18 is mounted to the vehicle 12 via a support structure indicated generally at 32. The support structure 32 can include rails 34 used to adjust the position of the vehicle seat assembly 10 relative to the vehicle 12. The support structure 32 can also include adjustment mechanisms (not shown) operable to adjust the vertical position of the vehicle seat assembly and/or the tilt of the vehicle seat assembly 10 relative to the vehicle 12.

The vehicle seat assembly 10 also includes an inflatable airbag system 20 of the present invention. The inflatable airbag system 20 is operatively mounted to the vehicle seat assembly 10 and includes an inflatable airbag 22. The inflatable airbag 22 is adapted to inflate outward from the vehicle seat assembly 10 to thereby act as a protective barrier between the occupant 14 and the vehicle 12 as will be described in greater detail below.

In the embodiment shown, the lower seat assembly 18 includes a seat pan 36, a lower seat cushion 38 supported by the seat pan 36, and a trim piece 40 at least partially covering the lower seat cushion 38 (FIG. 1). The seat pan 36 is substantially flat and rigid to adequately support the occupant 14.

The seat pan 36 also defines a substantially vertical wall 37 extending substantially completely about the seat pan 36, which, in turn, defines an edge 39 extending substantially completely about a top of the wall 37. The lower seat cushion 38 can be made of a substantially soft and pliable material such as foam to lend cushioned support to the occupant 14. The trim piece 40 can be made of a wear-resistant material such as leather or fabric to provide a wear-resistant and comfortable surface for the occupant 14 to sit upon. As shown in FIG. 3, the lower seat assembly 18 defines a top side 42 upon which the occupant 14 sits. The lower seat assembly 18 also defines a bottom area 44 where the support structure 32 is disposed.

The inflatable airbag system 20 includes a cover member 46 adapted for stowing the inflatable airbag 22 therein. The inflatable airbag 22 is adapted to inflate outward from the cover member 46 and outward from the vehicle seat assembly 10 as will be described in greater detail below.

The inflatable airbag system 20 also includes an inflator 50 shown schematically in FIGS. 1 and 2. The inflator 50 is operable to inflate the inflatable airbag 22. The inflator 50 can be one of any suitable device such as a gas-discharging inflator 50. In the embodiment shown in FIG. 2, the inflator 50 is operatively supported by the cover member 46.

The inflatable airbag system 20 further includes at least one sensor 52 schematically illustrated in FIGS. 1 and 2. The sensor 52 is operable to detect a triggering event such as a vehicular collision. The sensor 52 can be one of any one of a known type suitable to detect a triggering event. Also, the inflatable airbag system 20 includes a controller 54 shown schematically in FIGS. 1 and 2. The controller 54 is in communication with the sensor 52 and the inflator 50.

In operation, when the sensor 52 detects a triggering event, the sensor 52 sends a signal to the controller 54, and upon receiving that signal, the controller 54 sends an inflate signal to the inflator 50. The inflator 50 then inflates the inflatable airbag 22 outward from the cover member 46.

In the embodiment shown, the inflatable airbag 22 is operatively supported by the cover member 46, and the cover member 46 is adapted for mounting to the vehicle seat assembly 10. In the embodiment shown, the cover member 46 is supported by the seat pan 36 of the lower seat assembly 18 such that the inflatable airbag 22 is operatively supported by the lower seat assembly 18. The cover member 46 can be attached to the seat pan 36 in any suitable means such as fasteners, adhesives, or the like. However, those having ordinary skill in the art will appreciate that the cover member 46, and thus the inflatable airbag 22, could be supported by any suitable structure within the lower seat assembly 18.

As shown in FIGS. 1 and 2, the cover member 46 is disposed below the seat pan 36 such that the inflatable airbag 22 is also disposed below the seat pan 36 when stowed. The seat pan 36 includes an opening 56 such as a slot, and the inflatable airbag 22 is adapted to inflate through the opening 56 of the seat pan 36 as best seen in FIGS. 1 and 2. Also, the lower seat cushion 38 includes an aperture 60 such as a slit as shown in FIG. 1. The inflatable airbag 22 is adapted to inflate through the aperture 60 of the lower seat cushion 38 and outward from the lower seat cushion 38. Furthermore, the trim piece 40 includes a seam 62 as shown in FIGS. 1 and 3. The inflatable airbag 22 is adapted to inflate through the seam 62 and outward from the trim piece 40.

As such, the inflatable airbag 22 is adapted to inflate outward from the seat pan 36 through the opening 56, outward from the lower seat cushion 38 through the aperture 60, and outward from the trim piece 40 through the seam 62. Those having ordinary skill in the art will appreciate however, that the inflatable airbag 22 could inflate in any manner outward from the vehicle seat assembly 10 without moving through the seat pan 36, the lower seat cushion 38, and/or the trim piece 40. For instance, the inflatable airbag 22 could inflate along a side of the seat pan 36, displace the lower seat cushion 38, and/or displace the trim piece 40 without departing from the scope of the invention.

In the embodiment shown, the opening 56, the aperture 60, and the seam 62, are each disposed adjacent the outboard side 30 of the vehicle seat assembly 10, and the inflatable airbag is adapted to inflate outward from the outboard side 30 of the vehicle seat assembly 10. In one embodiment, the opening 56 in the seat pan 36 has a periphery 58 (FIGS. 1 and 2) adapted to direct inflation of the inflatable airbag 22 in a predetermined direction outward from the lower seat assembly 18. For instance, the periphery 58 of the opening 56 imparts force on the inflatable airbag 22 as it inflates to direct the inflatable airbag 22 toward the outboard side 30 of the vehicle seat assembly 10. Thus, as best shown in FIG. 3, the inflatable airbag 22 is directed toward a door 64 of the vehicle 12. As such, the inflatable airbag 22 acts as a protective barrier between the legs 66 of the occupant 14 and the door 64 of the vehicle 12 for improved restraint of the occupant 14.

Thus, the inflatable airbag system 20 can be compactly stowed within the vehicle 12 and can provide improved restraint of the occupant 14. By incorporating the inflatable airbag system 20 into the vehicle seat assembly 10, material costs can be reduced. For instance, the seat pan 36 can have high structural strength, and as such, the seat pan 36 can withstand the high energy pulse occurring when the inflatable airbag 22 inflates, thereby reducing the need for a high strength, high cost cover member 46. Also, the inflatable airbag system 20 utilizes the seat pan 36 as a barrier from potentially contaminating materials to thereby extend the operating life of the system 20.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A seat assembly for a vehicle comprising:
   a lower seat assembly adapted to support an occupant of the vehicle and including a seat pan that defines a substantially vertical wall, an edge extending about a top of said wall, and an opening defined in said wall and edge and having a periphery;
   a cover member adapted for mounting to said lower seat assembly; and
   an inflatable airbag adapted to be stowed in said cover member and to inflate through said opening of said seat pan and outward from said cover member to act as a protective barrier between the occupant and an interior surface of the vehicle;
   wherein said periphery of said opening of said seat pan is adapted to impart force on said inflatable airbag as said inflatable airbag inflates to direct said inflatable airbag in a predetermined direction.

2. A vehicle seat assembly as set forth in claim 1 wherein said cover member is disposed below said seat pan.

3. A vehicle seat assembly as set forth in claim 1 wherein cover member is supported by said seat pan.

4. A vehicle seat assembly as set forth in claim 1 wherein said lower seat assembly further includes a lower seat cushion supported by said pan, and wherein said inflatable airbag is adapted to inflate outward from said lower seat cushion.

5. A vehicle seat assembly as set forth in claim 4 wherein said lower seat cushion includes an aperture, and wherein said inflatable airbag is adapted to inflate through said aperture of said lower seat cushion.

6. A vehicle seat assembly as set forth in claim 1 wherein said lower seat assembly further includes a trim piece at least partially covering said lower seat assembly, and wherein said inflatable airbag is adapted to inflate outward from said trim piece.

7. A vehicle seat assembly as set forth in claim 6 wherein said trim piece includes a seam, and wherein said inflatable airbag is adapted to inflate through said seam.

8. A vehicle seat assembly as set forth in claim 1 further including an inflator operatively supported by said cover member and operable to inflate said inflatable airbag.

9. A vehicle seat assembly as set forth in claim 1 further defining a side, and wherein said inflatable airbag is adapted to inflate outward from said side of said vehicle seat assembly.

* * * * *